US011830090B2

(12) United States Patent
Farrokhabadi et al.

(10) Patent No.: US 11,830,090 B2
(45) Date of Patent: *Nov. 28, 2023

(54) METHODS AND SYSTEMS FOR AN ENHANCED ENERGY GRID SYSTEM

(71) Applicant: BluWave Inc., Ottawa (CA)

(72) Inventors: Mostafa Farrokhabadi, Ottawa (CA); Parham Momtahan, Ottawa (CA); Devashish Paul, Ottawa (CA)

(73) Assignee: BluWave Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/522,045

(22) Filed: Nov. 9, 2021

(65) Prior Publication Data

US 2022/0215485 A1 Jul. 7, 2022

Related U.S. Application Data

(63) Continuation of application No. 16/717,012, filed on Dec. 17, 2019, now Pat. No. 11,170,456, which is a
(Continued)

(51) Int. Cl.
*G06Q 50/00* (2012.01)
*G06Q 50/06* (2012.01)
(Continued)

(52) U.S. Cl.
CPC ............. *G06Q 50/06* (2013.01); *G05B 15/02* (2013.01); *G06Q 10/04* (2013.01); *H02J 13/00* (2013.01); *G05F 1/66* (2013.01)

(58) Field of Classification Search
None
See application file for complete search history.

(56) References Cited

U.S. PATENT DOCUMENTS 10,510,128 B1  12/2019  Farrokhabadi et al.
11,170,456 B2 * 11/2021  Farrokhabadi ......... G06Q 10/04
(Continued)

OTHER PUBLICATIONS

Written Opinion dated Aug. 20, 2019 for Appl. No. PCT/IB2019/054250, 6 pages.
(Continued)

*Primary Examiner* — Paul B Yanchus, III
(74) *Attorney, Agent, or Firm* — Sterne, Kessler, Goldstein & Fox P.L.L.C.

(57) ABSTRACT

Disclosed herein are embodiments for optimization of an energy grid system. First and second prediction models associated with a first energy grid system and a second energy grid system, respectively, may be trained based on historical data associated with each energy grid system. A prediction model basis may be created including the first and second prediction models. Training data associated with a third energy grid system may be input into each prediction model of the prediction model basis, and an accuracy of the prediction models may be evaluated to determine whether the prediction model basis is complete. When complete, a context-matching model may be trained based on subsequent energy grid systems until the context-matching model is determined to be sufficiently accurate. Then, the context-matching model may be used to identify a prediction model matching a new energy grid system, which may be used to warm-start the new energy grid system.

20 Claims, 15 Drawing Sheets

Related U.S. Application Data continuation of application No. 16/419,792, filed on May 22, 2019, now Pat. No. 10,510,128.

(60) Provisional application No. 62/712,456, filed on Jul. 31, 2018, provisional application No. 62/674,823, filed on May 22, 2018.

(51) Int. Cl.
| | | |
|---|---|---|
| *G06Q 10/04* | (2023.01) | |
| *G05B 15/02* | (2006.01) | |
| *H02J 13/00* | (2006.01) | |
| *G05F 1/66* | (2006.01) | |

(56) References Cited

U.S. PATENT DOCUMENTS

| | | |
|---|---|---|
| 2010/0100250 A1 | 4/2010 | Budhraja et al. |
| 2010/0179704 A1 | 7/2010 | Ozog |
| 2012/0239213 A1 | 9/2012 | Nagata et al. |
| 2013/0232094 A1 | 9/2013 | Anderson et al. |
| 2018/0307216 A1 | 10/2018 | Ypma et al. |

OTHER PUBLICATIONS

International Search Report dated Aug. 20, 2019 for Appl. No. PCT/IB2019/054250, 3 pages.

\* cited by examiner

METHODS AND SYSTEMS FOR AN ENHANCED ENERGY GRID SYSTEM

CROSS REFERENCE TO RELATED APPLICATIONS

This application is a continuation application of U.S. application Ser. No. 16/717,012, filed Dec. 17, 2019, which is a continuation of U.S. application Ser. No. 16/419,792, filed May 22, 2019, which claims the benefit of U.S. Provisional Application No. 62/674,823, filed May 22, 2018, and the benefit of U.S. Provisional Application No. 62/712,456, filed Jul. 31, 2018, all of which are incorporated by reference herein in their entirety.

BACKGROUND

Machine Learning (ML) can be used in renewable energy systems, such as, for example, wind, tidal, or photovoltaic power systems, to improve the use of variable renewable resources and energy generation and consumption demands. In machine learning models, statistically significant inputs and stochastic methods are used to predict future resource availability and demand requirements, which can then be used to schedule generation, storage, load shaping and pricing to optimize the economics of energy systems including energy grids. The generation of prediction and optimization models can similarly be based on machine learning and can be performed in and are affected by the context of a particular energy grid deployment.

One of the challenges of applying machine learning to systems with data collected over a significant period of time, such as renewable energy systems, is the time required for the model to learn, or be trained. This training requires data to be collected over a sufficiently long time-interval for such machine learning models to be properly trained. Accordingly, critical issues remain with regards to the time required to train and deploy machine learning models for use in systems with time series data, including in energy systems that form an energy grid.

In addition, current machine learning applications do not address the problem of how to use a machine learning model generated in one context to improve the accuracy and reduce deployment time of a machine learning model to be used in another context. For example, to provide better energy generation forecasts in a renewable wind farm, a ML system may use weather predictions and wind turbine system characteristics, such as location of wind turbines, terrain type in which the turbines are located, and proximity to bodies of water, to generate a machine learning model. Similarly, in a photovoltaic power generation system, a ML system may use, for example, weather predictions, locational solar characteristics, and photovoltaic panel and tilt mechanism characteristics, to generate a machine learning model. The sum of this input data is the context within which the machine learning model is generated. But current ML models are typically specific to the context in which they are generated and cannot accurately be used in a different context, e.g., a different renewable wind farm.

SUMMARY

Disclosed herein are system, apparatus, device, method and/or computer program product embodiments, and/or combinations and sub-combinations thereof, for enhancement and optimization of an energy grid system, such as a wind energy farm, solar farm, or energy storage system (e.g., battery energy storage system (BESS) or other electrical energy storage system, water storage system, heat storage system, potential energy storage system, etc.). In an embodiment, a center subsystem may be configured to train a first prediction model associated with a first energy grid system based on historical data associated with the first energy grid system, and a second prediction model associated with a second energy grid system based on historical data associated with the second energy grid system. A prediction model basis may be created including the first prediction model and the second prediction model.

In an embodiment, an energy grid manager subsystem may be configured to collect a first set of context parameters associated with the first energy grid system and a second set of context parameters associated with the second energy grid system. Each set of context parameters may include one or more of terrain profiles, longitude, latitude, grid coordinates, contour lines, climate types, seasonal forecasts, wind speed, solar exposure, proximity to water, and average annual temperature, according to an embodiment. The first and second sets of context parameters may represent an environment of the first energy grid system and the second energy grid system, respectively. The context parameters may then be transmitted to the center subsystem. In an embodiment, the center subsystem may assign a first context-matching signature to the first set of context parameters and a second context-matching signature to the second set of context parameters. The context signatures may be stored in a context-matching repository.

In an embodiment, training data associated with a third energy grid system may be input into each prediction model of the prediction model basis. A highest accuracy prediction model may be selected by evaluating an accuracy of each prediction model of the prediction model basis. This evaluation may involve comparing an output of the prediction model to historical data associated with the third energy grid system. When the highest accuracy prediction model exceeds a first prediction accuracy threshold, it may be determined that the prediction model basis is complete.

In an embodiment, a set of context parameters associated with a fourth energy grid system may be received. A context-matching model may be trained by inputting the set of context parameters associated with a fourth energy grid system into the context-matching model to identify a candidate prediction model from the prediction model basis. An accuracy of the candidate prediction model may then be evaluated based on historical data associated with fourth energy grid system. When the accuracy of the candidate prediction model exceeds a second prediction accuracy threshold, it may be determined that the context-matching model is sufficient. Finally, for each subsequent energy grid system, a target prediction model may be selected from the prediction model basis using the context-matching model. A new prediction model associated with the subsequent energy grid system may then be warm-started using the target prediction model.

In another embodiment, an energy grid manager subsystem includes a data manager configured to collect a plurality of context parameters from a first energy grid system and transmit the plurality of context parameters to a center subsystem. In an embodiment, the context parameters may include one or more of terrain profiles, longitude, latitude, grid coordinates, contour lines, climate types, seasonal forecasts, wind speed, and solar exposure of the first energy grid system. The center subsystem may include a context manager configured to receive the plurality of context parameters from the data manager.

In an embodiment, the context manager may then generate a first context signature for the first energy grid system based on the plurality of context parameters. The context signature may represent an environment of the first energy grid system, as defined by the context parameters. The context manager may retrieve a second context signature associated with a second energy grid system from a context repository. The second context signature may be associated with an ML prediction model configured to control the second energy grid system. The context manager may then compare the first context signature to the second context signature to determine whether a similarity of the first context signature and the second context signature exceeds a similarity threshold.

In an embodiment, a model generator of the center subsystem may retrieve historical data associated with the second energy grid system stored in the context repository. The historical data may represent data collected over a period of time from the second energy grid system, for example data related to energy demand, generation, and storage. If the similarity of the first context signature and the second context signature exceeds the similarity threshold, the model generator may generate a prediction model for the first energy grid system based on the retrieved historical data associated with the second energy grid system. The data manager of the energy grid manager subsystem may then input data from the first energy generation system into the prediction model and use the output of the prediction model to control an operable element of the first energy generation system. In an embodiment, the operational task may be one of an electrical element, a mechanical element, a chemical element, a chemical reaction element, and an electromechanical element of the first energy grid system. Thus, these systems and processes enables a warm-start of the prediction model for the first energy grid system using data from the second energy grid system.

In various embodiments, the features outlined above may be performed by different components of the energy grid manager subsystem or the center subsystem.

Further embodiments, features, and advantages of the invention, as well as the structure and operation of the various embodiments, are described in detail below with reference to accompanying drawings.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, directed to using machine learning models developed in one context, such as a particular energy grid system, to efficiently develop machine learning models in other contexts, enabling enhancement and optimization of such energy grid systems. These machine learning models may be used to predict and control energy produced by energy grid systems, such as a photovoltaic or wind turbine system, and energy demands, such as electrical consumer loads. Various inputs, such as the geographical position of the energy grid system, the terrain characteristics of the area in which the system is deployed, local weather forecasts, and vehicular traffic forecasts, may be used in the process of generating these predictions.

In the past, deployment of such predictive models in energy grid systems typically took significant time. In order to train the models used to control the energy grid systems, data would need to be collected over a period of months or years to obtain an accurate picture of the operational environment, especially considering differences in operational environments across different energy grid systems. However, much of this lengthy process can be bypassed by training new predictive models with data from other similarly situated energy grid systems, i.e., energy systems residing in a similar context. This "warm-start" can enable efficient use of new energy systems almost immediately upon deployment, and the accuracy of this process generally improves as more similarly situated energy grid systems are deployed. Then, rather than waiting for data to be collected over time, the collected data may simply be used to refine the predictive model employed by the energy grid system.

Figure 1:
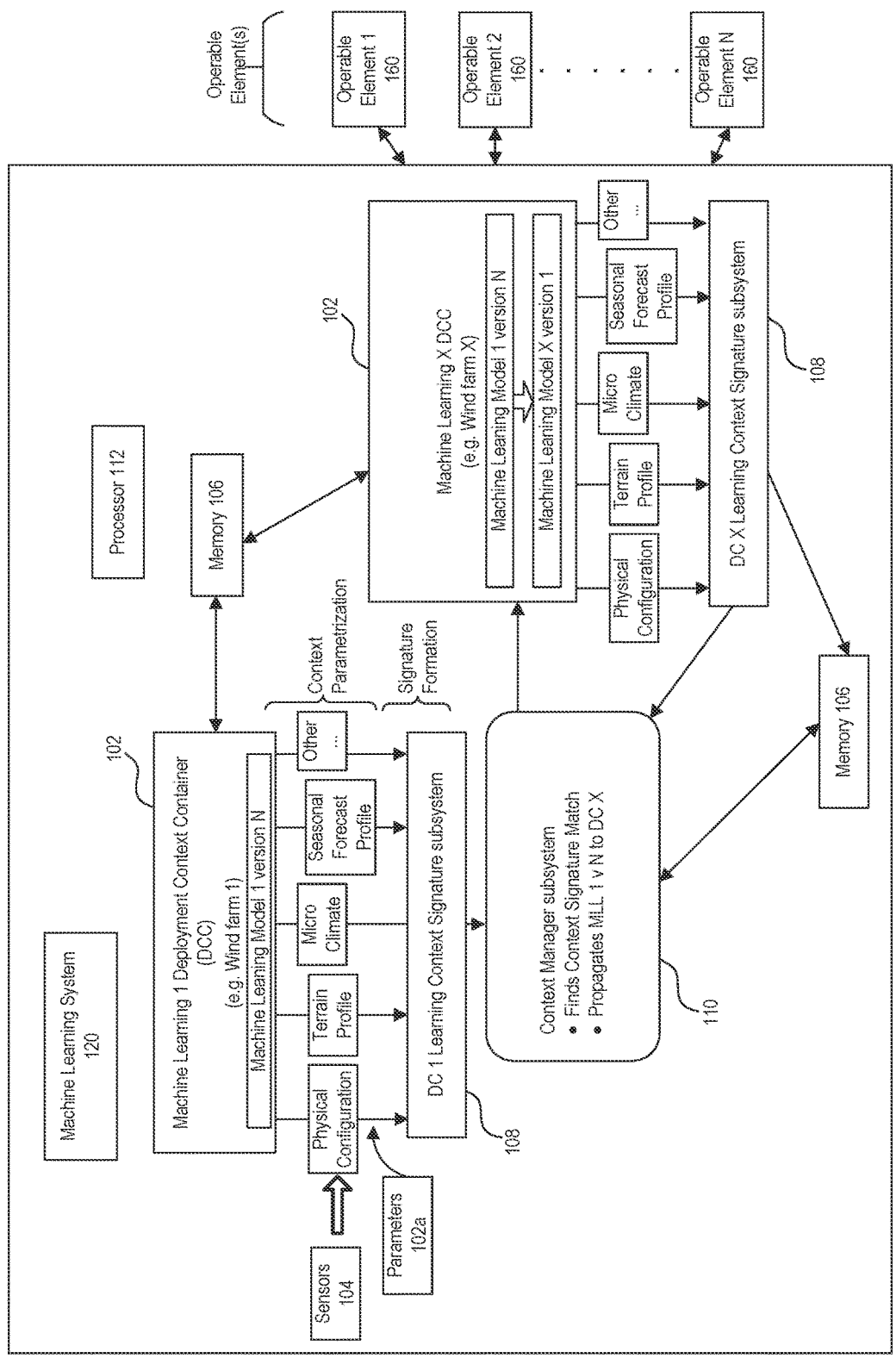
FIG. 1 is a block diagram of an example system for implementing a first machine learning model based on the output of a second machine learning model, according to some embodiments.

FIG. 1 is a block diagram 100 of an example system for implementing a first machine learning model based on the output of a second machine learning model, according to some embodiments. Thus, one energy grid system may be controlled based on the output of a second energy grid system. The system 100 includes one or more deployment Context Container (DCC or DC) subsystems 102 enable characterization of a deployment in terms of a plurality of parameters 102a that are pertinent to machine learning model formation. The parameters 102a include identifiers of system elements of the system for which machine learning is being performed or to which machine learning is being applied. In an embodiment, these parameters may be input data received from one or more sensors 104 and fed into DC subsystem 108. DCC subsystem 102 may be used in any number of applications. In an embodiment, DCC subsystem 102 may be deployed in a renewable energy generation system that may include one or more wind turbine systems, photovoltaic power generation system, or other power generation systems and their infrastructure.

In an example, where DCC subsystem 102 is implemented or deployed in a renewable energy power grid system, the system identifiers (physical configuration) may include the type and model identifiers of wind turbines, solar panels, batteries, diesel generators, and the like. Additional parameters 102a may include terrain profile of the location in which the DCC subsystem 102 is deployed, including, for example, longitude, latitude, grid coordinates, elevation and contour lines. Parameters 102a may also include microclimate type identifiers of the location in which the DCC subsystem 102 is deployed, for example, desert, arctic, seaside, and the like, as well as seasonal identifiers (seasonal forecast profile) of the specific time in which the data is collected. Other parameters may be collected and used in DCC subsystem 102. Parameters 102a can be collected from sensors 104. For example, longitude and latitude data may be collected by a global position satellite sensor and terrain profile may be collected by radar, or LIDAR sensors. The input collected from parameters 102a may be stored in a memory 106 of system 100. Data stored in memory 106 of system 100 may also include data that can be fed into the system 100 as one or more of parameters 102a. For example, seasonal forecast data or map data can be commercially available weather or map data stored in memory 106 and accessed by one or more processors 112 of system 100. Memory 106 may also include computer executable instructions that when executed cause processor 112 to perform the actions described herein. DCC Subsystem 102 may also include a memory (not shown) configured to store computer executable instructions and a digital processor (not shown) configured to execute the instructions stored within the memory.

In an embodiment, the system 100 further includes a learning context signature subsystem 108 that includes memory (not shown) and a processor (not shown). The processor of learning context signature subsystem 108 is configured to execute instructions stored in memory to perform a matching step that can be a random forest technique described in: Liaw, Andy, and Matthew Wiener. "Classification and Regression by Random Forest." R news 2.3 (2002): 18-22. A post analysis is performed by subsystem 108 to determine the most relevant of Parameters 102a in the task of context matching, and subsequently request those signatures from the first machine learning model, i.e., the associated DCC 102.

In an embodiment, the system 100 also includes a context manager subsystem 110 that includes a memory (not shown) and a processor configured to execute instructions stored within the memory to cause the system 110 to maintain a database of one or more machine learning models, associated signatures developed by the context signature subsystem 108, and the quality score of these signatures. The Context Manager Subsystem 110 is also configured to, on a periodic basis, load or upgrade one or more machine learning models in one or more of the DCC subsystems 102 based on the signature and quality score. In this manner, a machine learning model can be applied to a different DCC subsystem 102 based on the model developed for a separate DCC subsystem 102 with similar characteristics, thus reducing the amount of time for training or implementing a machine learning model on a new or different DCC subsystem 102.

Figure 4:
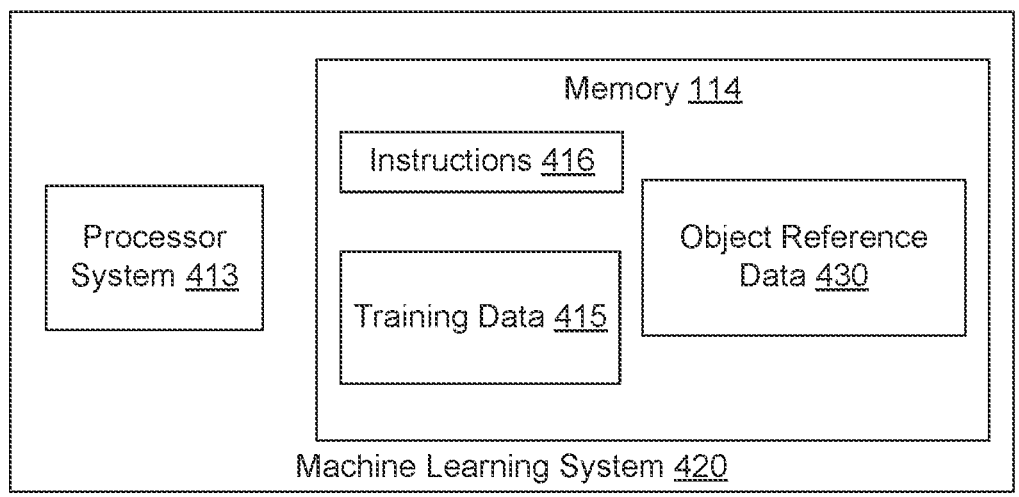
FIG. 4 illustrates an example machine learning system, according to an embodiment.

In an embodiment, system 100 includes one or more machine learning systems 120, illustrated further in FIG. 4, which perform the machine learning steps described herein. Machine learning system 120 may include a digital processor 113 that may include one or more digital processing units. Machine learning system 120 also includes memory 114 that has one or more transient and non-transient digital memory storage elements. Computer executable instructions 116 are stored in the memory 114 that configure the processor 113 and machine learning system 120 to perform the functions as described herein.

In an embodiment, a training dataset 115 may also be stored in memory 114. Training dataset 115 includes a base set of data that the machine learning system 120 can build on and refine to create and update object reference dataset 130 for the system 102. For example, the DCC subsystem 102 may use the reference dataset 130 to determine the appropriate amount of power to generate from a wind turbine system. The resulting power generation parameters developed by DCC subsystem 102 may be stored in memory 114 or another memory for access by other components of system 100. Machine learning system 120 may also use reinforcement learning or other machine learning techniques as understood in the art, including options graph based learning, to develop the training data set 115.

By using such machine learning techniques, system 102 may be capable of learning how to react based on previous situations experienced by the system 100 and can propagate this learned behavior from one DCC subsystem 102 to another DCC subsystem 102. These experiences may be transferable and a subsequent DCC subsystem 102 may learn how to respond to a particular situation without individually experiencing that situation. The overall system 100 may also be able to generalize learned situations to unknown situations more easily.

System 100 may be configured to control one or more operable elements 160 which may be within DCC subsystem 102, or may be external to system 100. In operation, based on the machine learning model developed or propagated by system 100, one or more operable elements 160, for example, a wind turbine, may be controlled, to for example, increase or decrease the speed of the wind turbine to generate more or less power.

The operable elements 160 may include an electrical element, a mechanical element, a chemical element, a chemical reaction element, and/or an electromechanical element, and/or a combination thereof. Selected one or more of the operable elements 160 can be activated to perform a task associated with the machine learning model generated or used, in some examples. For example, the operable element can include increasing the speed of a wind turbine by moving one or more arms, changing the direction of a photovoltaic cell by activating an actuated mechanism, or activating or deactivating an entire energy generation system. In some examples, the operable element may be operated to perform other functions such as detection/sensing of objects or environment, GPS localization, receiving road traffic volume, transmitting data, receiving data, communicating, etc. Such operations or actions may be performed by one operable element or by a combination of operable elements. Example operable elements therefore include, as part of system 100 and the constituent subsystems 102, 108, 110, or stand-alone, sensors, actuators, motors, lights, power controls, transceivers, transmitters, receivers, and/or communication subsystems.

Figure 2:
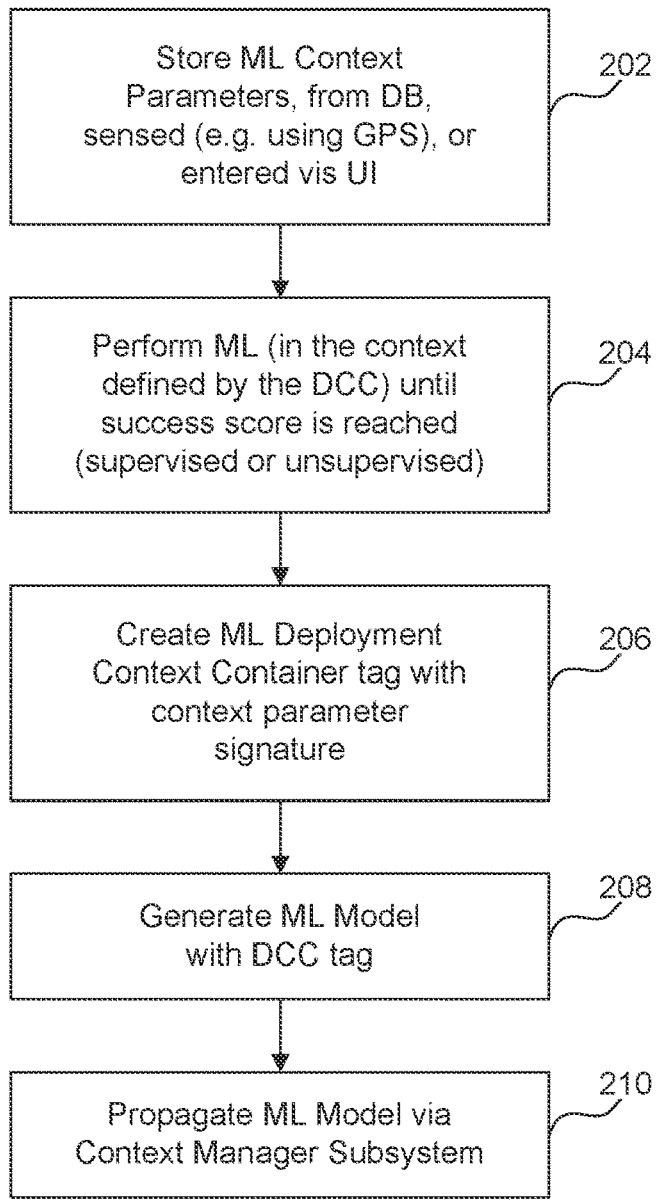
FIG. 2 is an example method for context-matched energy optimization, according to some embodiments.

FIG. 2 is an example method for context-matched energy optimization, according to some embodiments. Method 200 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

At stage 202, machine learning context parameters may be stored, for example in memory 106 of system 100. The parameters may include one or more of the parameters 102a obtained from sensors 104 or data which is entered via a graphical user interface (GUI), which may be a GUI of system. A user may interact with the GUI using a touchscreen and optionally other input devices (e.g., buttons, dials) to display or input relevant information. The GUI may comprise a series of traversable content-specific menus. In at least some embodiments, the data of system 100 may be inputted using an input/output device connected to system, which may be one or more of the GUI, touchscreen or another input device configured to provide instructions to system 100. These instructions may be stored in memory such as for example, memory 106 and may be executed by processor 112 to implement any of the steps described herein.

At step 204, machine learning techniques are performed, by for example, machine learning system 120 within the context defined by one of the DCC subsystems 120 until a success score is reached as described above. The machine learning performed by DCC subsystem 102 may be supervised or unsupervised, including methods such as regression, via an artificial neural network or other machine learning methods known in the art.

At stage 206, a context container tag is created within DCC subsystem 102 based on a context parameter signature created, for example by the learning context signature subsystem 108. A machine learning model is then created at stage 208 using the tags created at stage 206 and which is associated with the context of the DCC subsystem 102. At stage 210, the machine learning model created at stage 208 is propagated to another DCC subsystem 102 via a context manager subsystem 110. In this way, a machine learning model created in one context can be propagated and used as the machine learning model of another context when the characteristics of that second context match those of the first context within a defined threshold as described above, and determined by the random forest model.

Figure 3:
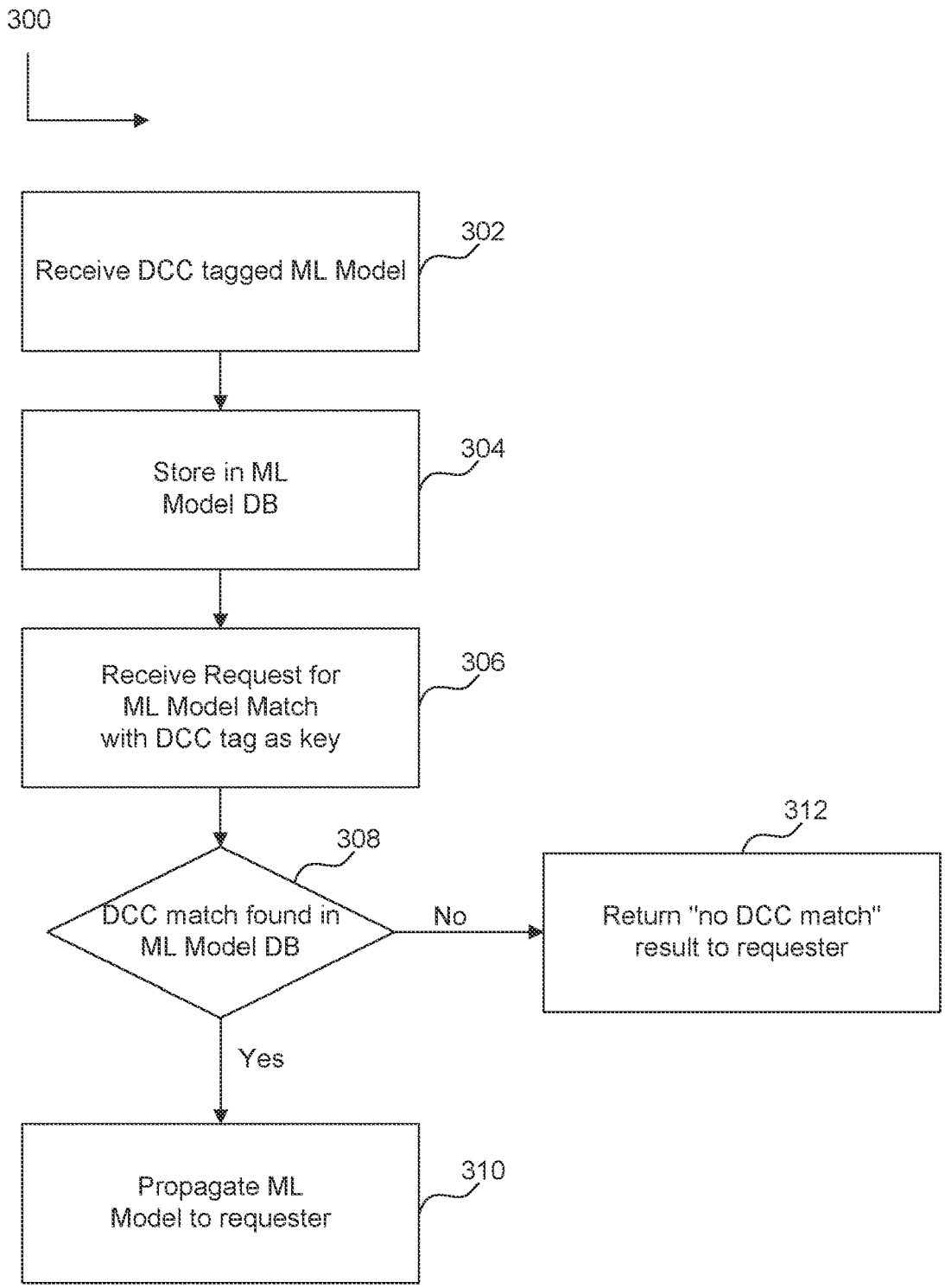
FIG. 3 is another example method for context-matched energy optimization, according to some embodiments.

FIG. 3 is another example method 300 for context-matched energy optimization, according to some embodiments. In the method 300, at step 302 and 304, respectively, a DCC tagged machine learning model is received and stored. The DCC tagged model may be based on the tag received from a DCC subsystem 102, similar to that described in method 200. At step 306, a request is received for a machine learning model that matches a DCC tag that has been received at step 302. The request may be received by one or more DCC subsystems 102 or external system. At step 308, a decision is reached regarding whether a machine learning model that has the requested characteristics is present in the database. Depending on the results of that query, at step 310, a matching machine learning model may be propagated to the requesting system, or step 312 is performed in which a negative message is relayed to the requesting system.

FIG. 4 illustrates an example machine learning system 420, which may be similar to machine learning system 120 of FIG. 1, according to some embodiments. In an embodiment, machine learning system 420 may include a digital processor 413, which may include one or more digital processing units. Machine learning system 420 may also include storage elements. Computer executable instructions 416 may be stored in the memory 414 that configure the processor 413 and machine learning system 420 to perform the functions as described herein.

In an embodiment, a training dataset 415 may also be stored in memory 414. Training dataset 415 may include a base set of data that machine learning system 420 can build on and refine to create and update object reference dataset 430. As described herein, training data set 415 may be obtained from one or more predictors, for example the predictors associated with system 100 of FIG. 1. Machine learning system 420 may also use reinforcement learning or other machine learning techniques as understood in the art, including options graph based learning, to develop the training data set 415.

Figure 5:
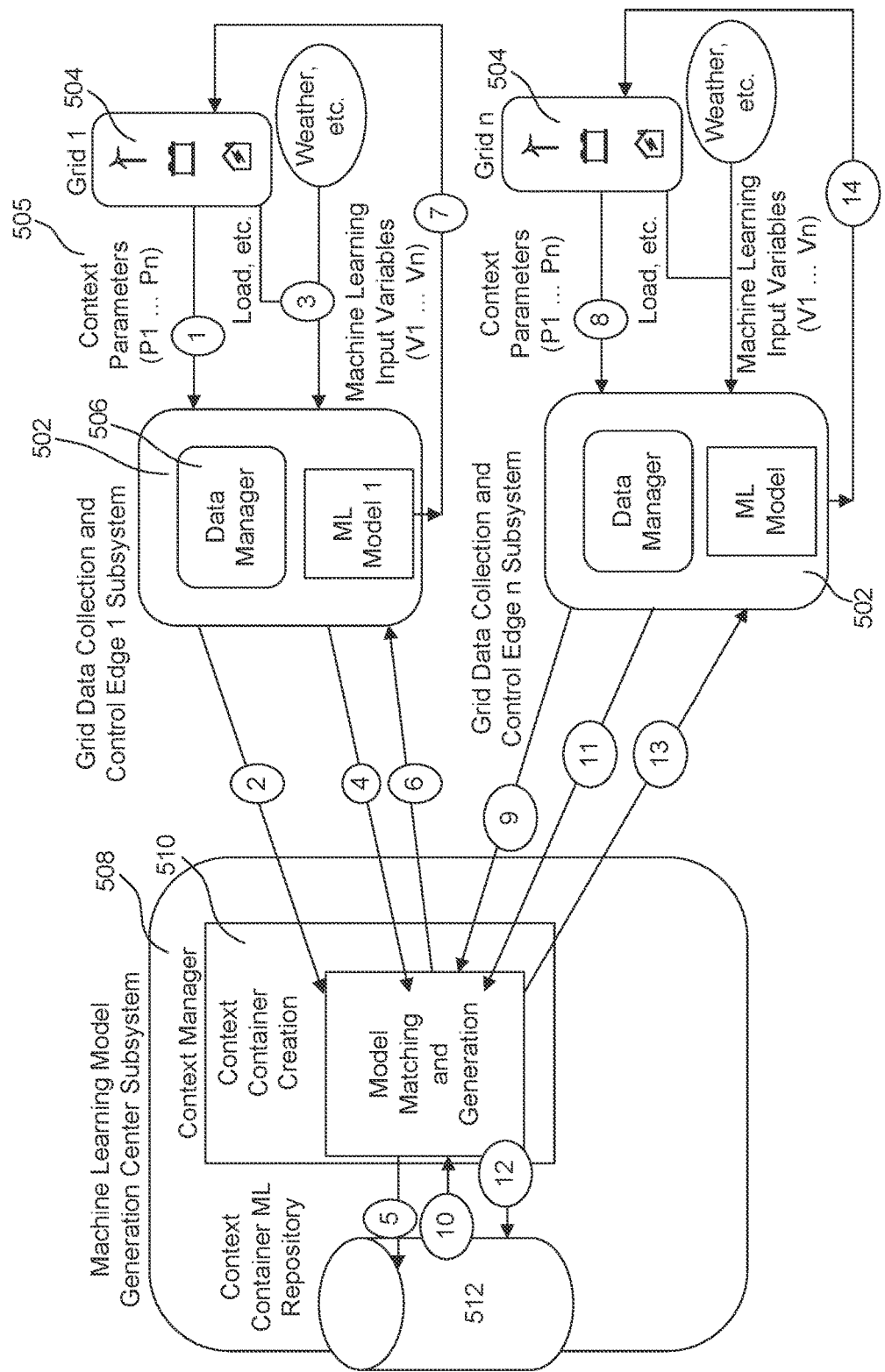
FIG. 5 illustrates an example system 500 for implementing a first machine learning model based on the output of a second machine learning model, according to some embodiments.

FIG. 5 illustrates an example system 500 for implementing a first machine learning model based on the output of a second machine learning model, according to some embodiments. The system 500 includes one or more grid data collection and control edge subsystems 502. The system 500 may include up to n edge subsystems 502 which are in communication with up to n grids 504. The grids 504 are associated with one or more context parameters 505 (P) such as context parameters 102a. The grids 504 may be conceptually similar to DCC 102 and may include one or more energy generation and storage systems such as a wind farm, a solar array or a hydroelectric generation station. Up to n context parameters 505 associated with a respective grid 504 are collected by a data manager 506 associated with the edge subsystem 502. The context parameters 505 can include one or more of machine learning variables received from an associated grid 504, such as load and generator schedules, or may be data received from external sensors such as sensor 104. The data may include, for example, amount of sun exposure and other weather data, or data about terrain including latitude and longitude coordinates, as discussed previously.

The system 500 may also include a machine learning model generation center subsystem 508 which includes a context manager 510, and a context container machine learning repository 512. The context manager 510 is in communication with one or more of the edge subsystems 502 by one of feedback or feedforward, by a shared memory or by a communications subsystem (not shown). The context manager 510 receives context parameters 505 from the edge subsystem 502 and creates a context data structure or model that contains a context signature based on the content of the context parameters 505 as further described herein. The context signature may represent the environment of an energy grid based on the characteristics defined by the context parameters. Context manager 510 then communicates to the edge subsystem 502 a readiness to commence receipt of machine learning input variables and to implement machine learning within the context data structure or model.

In an embodiment, the data manager 506 may then forward the ML variables associated with that specific context to the context manager 510. Based on the objective functions of the machine learning and the machine learning variables or other input, the context manager 510 may then generate a machine learning model. The machine learning model can be created and tested by, for example, using machine learning variables as obtained by system 500 and/or by historical data sets. Once the model is created, the model is attached to or associated with its context container and stored in the context container ML repository 512.

The models stored in the context container ML repository 512 may be communicated to one or more edge systems 502 by way of feedforward or feedback, shared memory or a communications system (not shown). The machine learning model may then be implemented within the edge subsystem 502 to perform a series of tasks associated with grid 504 through controlling one or more operable elements similar to operable elements 160 that may be associated with controlling one or more elements of grid 504. The tasks carried out by the machine learning models may include energy generation, storage, and capacity and load prediction. The machine learning model may also provide optimization recommendation inputs to the associated grid 504 based on the model and required parameters.

In an embodiment, multiple grids 504 may be associated with system 500. When an additional grid is deployed or included within system 500, the steps as described above are performed. Context parameters 502 associated with that grid are communicated to the center subsystem context Manager 508. In an embodiment, context manager 508 may compare a context signature of the additional grid system to context signatures stored in context container repository 512. This comparison may involve generating a similarity metric (e.g., score) and comparing the metric to a predefined threshold. In an embodiment, the context manager 508 may use a random forest model to perform context-matching between the existing repository of context signatures stored in the context container repository 512 and the context data structure created by the context manager 510 to determine whether there is a context container whose signature matches the context signature of the associated grid 504. If a match is found then a new context is created for the associated machine learning model and the ML model from the matching context is used as the initial machine learning model for the grid 504.

In an embodiment, if a match is not found, an associated context model may be created as described above and stored in the context container repository 512. The created context model may similarly be searched for and used when subsequent grids are deployed.

The steps described above that may be performed by System 500 may be stored in a memory such as memory 106 and may be stored on a computer readable medium to allow it to be executed by a processor such as processor 112. The output of edge subsystem 502 may also be used to control one or more operable elements such as operable elements 160 to perform one or more actions of the grid 504. The embodiments described in FIGS. 1-5 may also apply similarly to applications outside of power grid systems.

FIGS. 6-9 describe embodiments for training, testing, and deploying a context-matching mechanism for use in developing machine learning models. The context-based matching mechanism may be applied, for example, to predict and control energy produced by an energy generation system, similar to energy generation systems described with respect to FIG. 1.

FIGS. 6A-6F are block diagrams of an example system 600 for training an energy system with time series data, according to some embodiments. Time series data generally refers to a series of data points indexed in time sequence order, which may represent, for example, energy usage data. While system 600 is described within the context of an energy system for purposes of explanation, system 600 may be applicable to any system involving time series data. In an embodiment, system 600 includes a center module 602 and an edge module 604. The center module 602 includes a memory 606 that is configured to store one or more databases and computer-executable instructions, and a processor 608 that is configured to train one or more machine learning models such as machine learning model 610a (referred generally as machine learning model 610) and to carry out other steps of the method. The edge module 604 also includes a memory 605 which may be a shared memory with the center module 602 or may be a separate memory of system 600. In some embodiments, the memory of the edge module 604 stores trained parameters of machine learning models 610a, receives real-time data and sensory inputs from one or more sensors 612, and contains a processor 613 to execute the machine learning tasks and sends outputs and recommendation signals to the center module 602 or to an energy system including an energy system 620a, b, . . . n (referred to generally as energy system 620). Energy system 620 refers to one or more energy systems, including the deployment of various physical components and communication infrastructure.

Figure 6A:
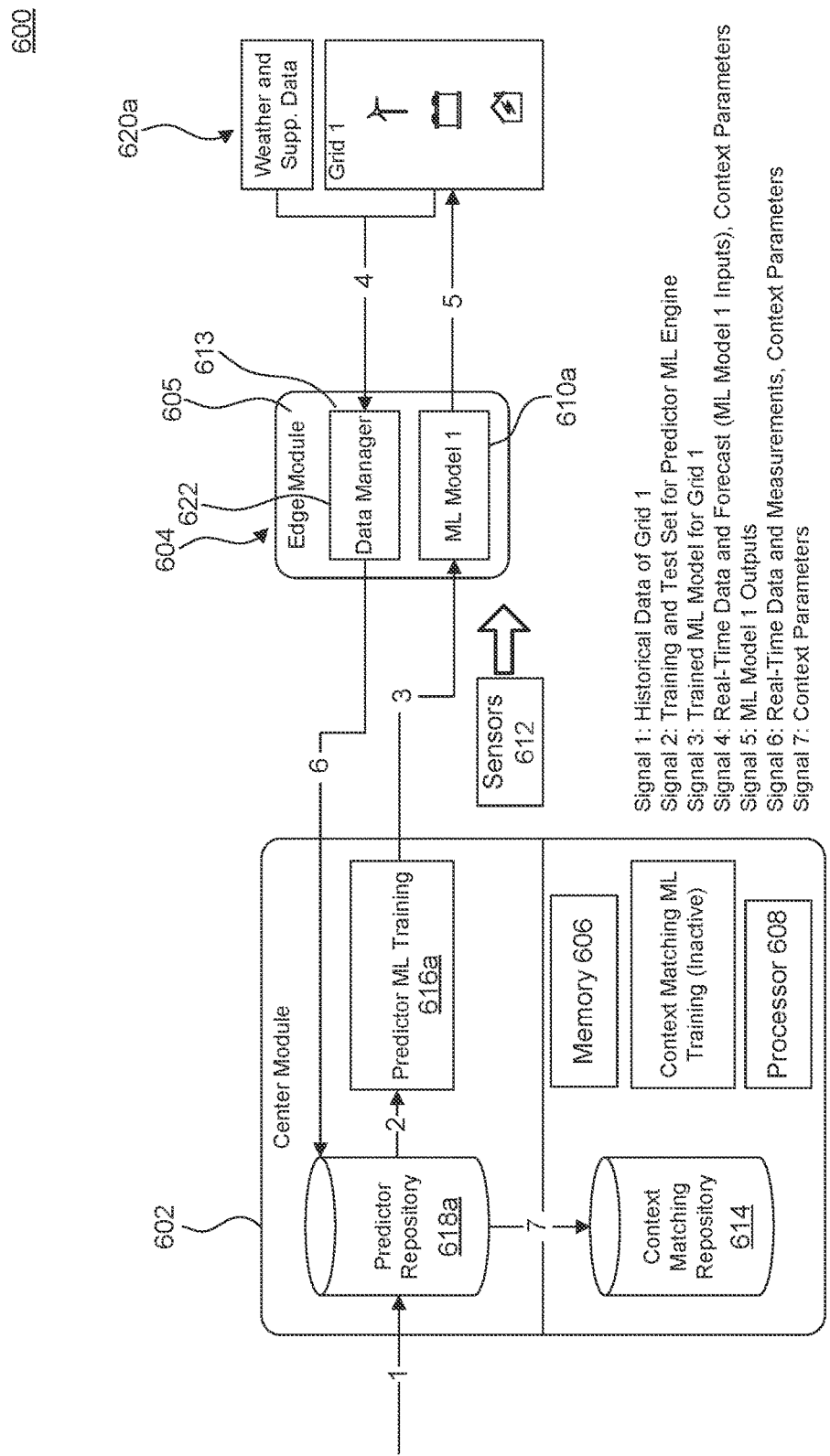
FIGS. 6A, 6B, 6C, 6D, 6E, and 6F are block diagrams of an example system for training an energy system with time series data, according to some embodiments.
Figure 6B:
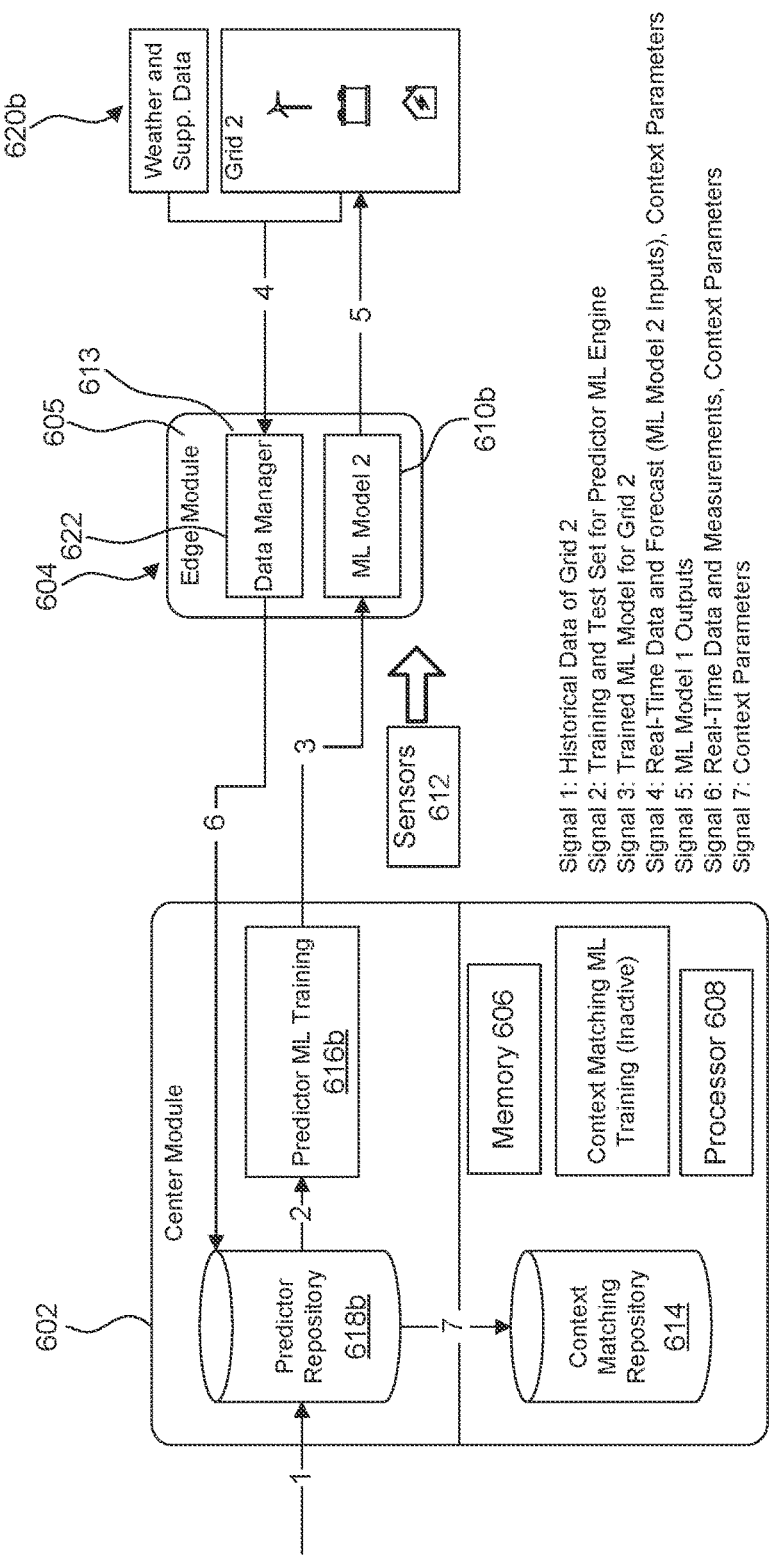

In an embodiment, training of an energy system with time series data using context-matching techniques described herein involves multiple stages. A first stage (stage 1) is depicted in FIGS. 6A and 6B for energy systems 620a and 620b, respectively. Initially, to begin the context-matching training procedure, at least two context-specific machine learning-based predictors are required to initiate the context-matching repository 614. The context matching repository 614 will provide the training data for the context-matching machine learning task that may be performed by machine learning models 610a or 610b, for example. The context matching machine learning task may be implemented by a multi-class classification model, while the prediction task may be implemented by a regression model. As shown in FIGS. 6A and 6B, in an embodiment, initially two (or more) machine learning-based predictors may be trained independently (simultaneously or sequentially) using predictor ML training modules 616a, 616b. The training modules 616a, 616b may include one or more processors configured to train a machine learning model. The training step can be performed using any number of training algorithms or machine learning training procedures including supervised learning, e.g., linear regression, or random forest algorithms. Context-related parameters for each project or grid 620a, 620b may be stored in the context-matching data repository 614 and these parameters may be used in subsequent steps of the method or by other components of the system 600. In some embodiments, the context parameters stored in repository 614 may be accessible by memory 606 of center module 602.

In an embodiment, historical data (shown as signal 1) may be used as an initial input from which subsequent training and test data (shown as signal 2) is then extracted for the predictor module 616a, 616b, and subsequently trained. The trained data sets (shown as signal 3) are then used as input for the machine learning model 610a, 610b, associated with the respective energy systems 620a, 620b. The historical data is stored in a predictor repository 618a, 618b. The choice of historical data depends on the predictor's task. For example, for a wind prediction task, the historical data may include historical wind speed, wind direction, temperature, relative humidity, pressure, etc. Care should be taken to ensure that same type of data is used for all predictor models to ensure improved accuracy of the models.

Relevant training and test sets may be selected out of the historical data depending on the prediction model's task. For example, for predicting wind speed, only historical data related to wind direction, historical wind speed, and temperature may be used. As described above, the training sets may then be trained using various machine learning training procedures, and are subsequently used as input for machine learning model 610a and/or 610b.

In an embodiment, real time measurements (shown as signal 4) from the energy systems 620*a*, 620*b* may be obtained. These real time measurements may include the same type of data as the training and test sets (signal 2) used by the respective predictor machine learning module 616*a*, 616*b*. In an embodiment, edge module 604 may include a data manager 122 that receives the real-time measurements, synchronizes the data, and re-samples or classifies the data if requires. Edge module 604 may also determine if the data is erroneous or incomplete. The processed real time data (shown as signal 6) may then subsequently be stored in the predictor repository 618*a*, 618*b*, associated with respective energy systems 620*a*, 620*b*. In this manner, real time measurements may also be available for use by the associated machine learning model 610*a*, 610*b* within the edge module 604 for prediction or other tasks. Finally, in an embodiment, certain context-related parameters (shown as signal 7) pertaining to each energy system 620*a*, 620*b* may be extracted from the data stored in the predictor repository 618*a*, 618*b*. The context-related parameters may include physical information with respect to the geographical location for each electrical energy system 620*a*, 620*b* including, for example, terrain information, proximity to water, latitude, longitude, average annual temperature, etc.

In the initial training stage described with respect to FIGS. 6A and 6B, context-matching machine learning tasks may not be required. In other words, the purpose of the initial training stage is to build a basis on which the context-matching technique may be applied.

Figure 6C:
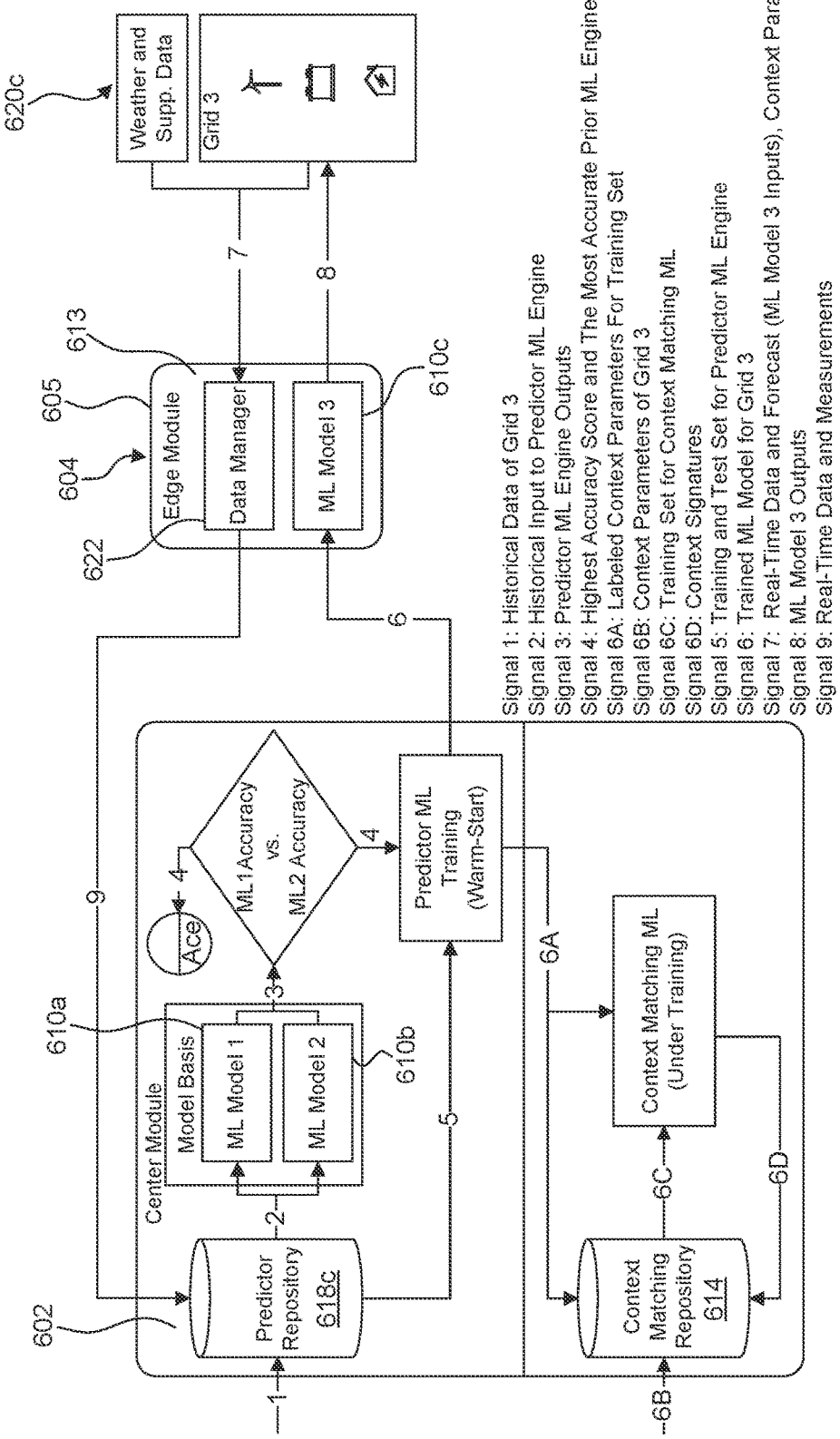

A second stage of the training is depicted in FIG. 6C, according to an embodiment. In this stage, historical physical, electrical, and meteorological measurement data (shown as signal 1) of an additional electrical energy system 620*c* may also be collected and stored in another predictor repository 618*c* associated with the energy system 620*c*. Similarly, real time data and forecasts, as well as machine learning model 610*c* inputs and context parameters (signal 7) can be collected and stored by data managers 622 and then input into predictor repository (signal 9) and used to extract training and test data to be used for training the machine learning models described herein. Based on the historical and other data, the proper set, i.e., the same type of data used as inputs to train the predictors 618*a*, 618*b* is selected and fed into the predictors 618*a*, 618*b* (via machine learning models 610*a*, 610*b*; shown as signal 2) and the accuracy of each predictor 618*a*, 618*b* is assessed. The output of the machine learning models 610*a*, 610*b* (signal 3) includes an accuracy metric. The accuracy metric may be defined by the operator, for example, a mean squared error or root mean squared error. System 600 may then assess the accuracy metric of each machine learning model 610*a*, 610*b* (signal 4) and determine the highest accuracy score, and the most accurate prior machine learning model 610*a*, 610*b*.

In an embodiment, the predictor 618*a* or 618*b* with the higher accuracy is used to warm-start the training process of the predictor 618*c* associated with energy system 620*c*. The context parameters of energy system 620*c* (signal 6B) can be stored in the context matching repository 614 and assigned a context-matching signature associated with machine learning model 620*c*. The context parameters may then be used to extract a training set (Signal 6C) to initiate the context-matching training procedure described further below. Additional training and test sets in the predictor repository 618*c* (signal 5) may be used as part of the training procedure. After the training procedure is complete, the trained machine learning model may be integrated as part of machine learning model 610*c* (signal 6), which may subsequently be used to control the operation of energy system 620*c*. Thus, this warm-start enables machine learning model 610*c* to be trained immediately, rather than relying on data collected over a significant period of time. Data collected by energy system 620*c* over time may then be used to optimize machine learning model 610*c*, rather than train the model from scratch.

In this case, the context-matching signature is a label for the set of context parameters (signal 6A) pertaining to each energy system 620*a*, 620*b*, 620*c*. Thus, the training set for the context-matching technique includes data pertaining to the context of each energy system, and the signature associated with the trained machine learning model for that project.

Figure 6D:
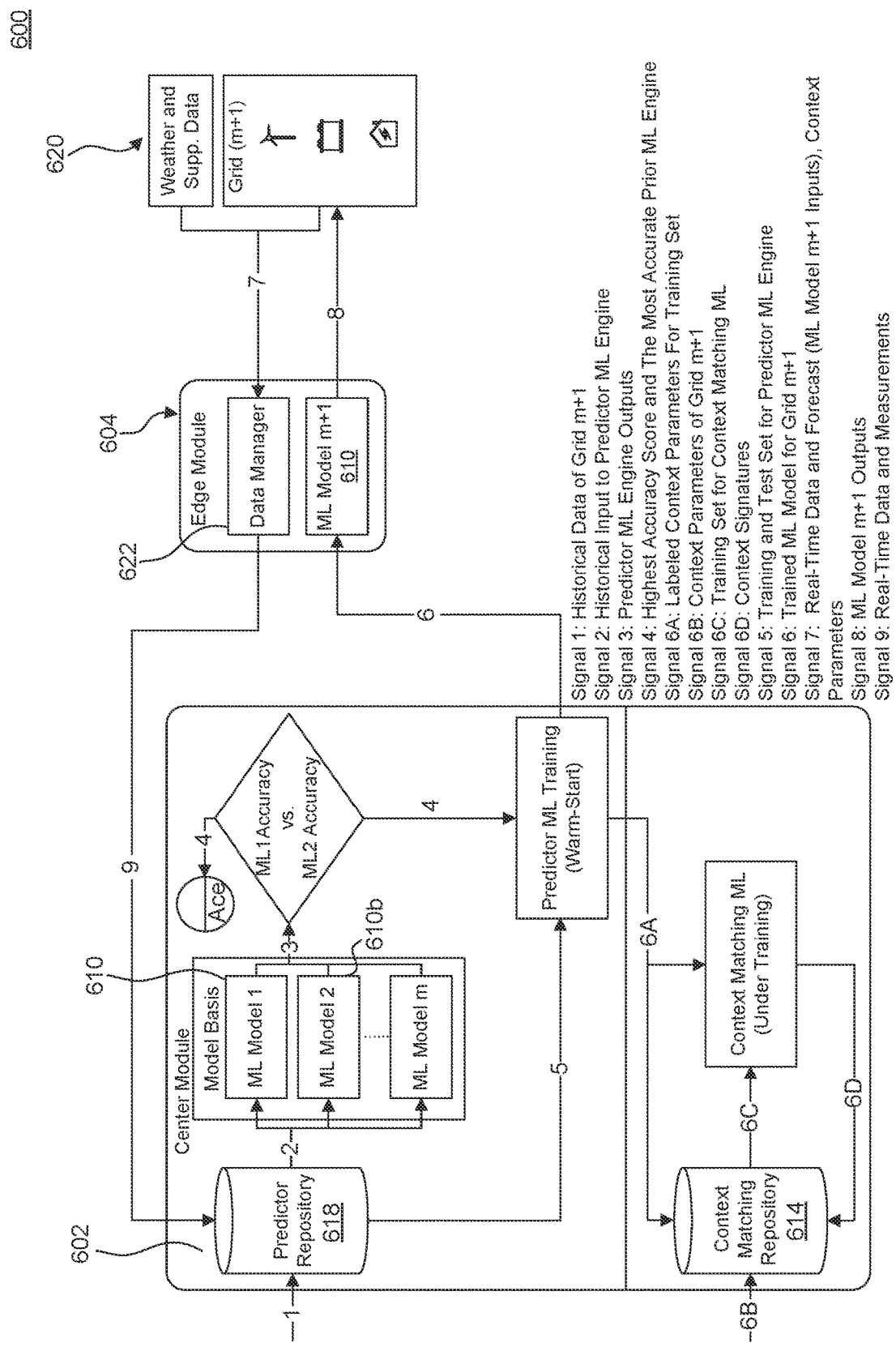

FIG. 6D illustrates a similar process to that described with respect to FIG. 6C, but continuing for the next m energy systems beyond energy system 620*c*. In an embodiment, this process continues until a context-matching model accuracy test is passed, implying that a sufficient number of context-classes have been gathered. This test can be, for example, that at least one of the previous predictors, when fed by the data pertaining to a new energy system 120, passes the prediction accuracy threshold for a pre-determined number of consecutive new energy systems. The threshold may be chosen, for example, based on the operator's desired performance. In an embodiment, the threshold may be the persistence model accuracy as described in Giebel, Gregor, Richard Brownsword, George Kariniotakis, Michael Denhard, and Caroline Draxl, "The state-of-the-art in short-term prediction of wind power: A literature overview," *ANEMOS.plus* (2011).

Figure 6E:
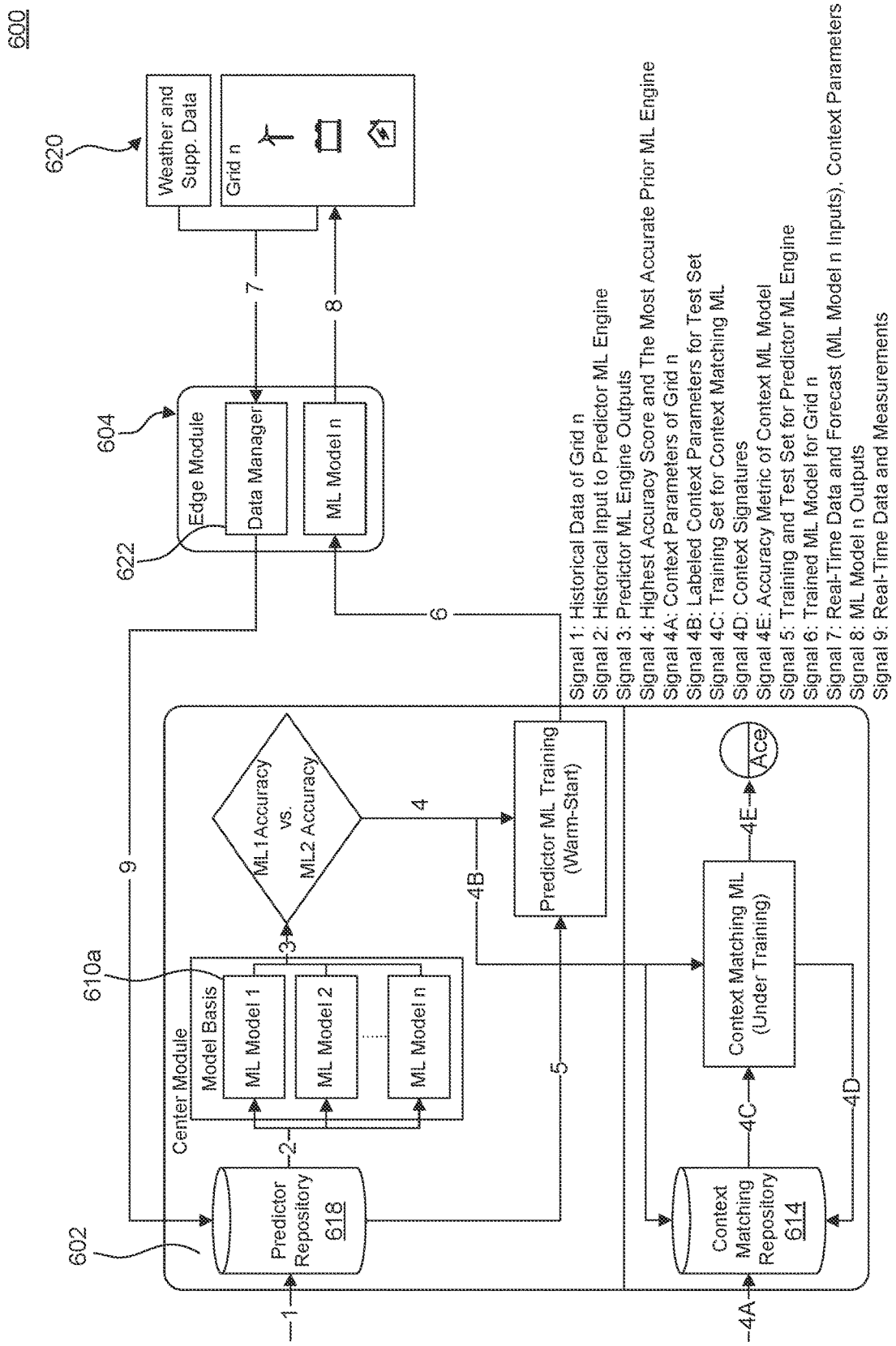

FIG. 6E illustrates a similar process to that described with respect to FIGS. 6C and 6D when there are n number of energy systems, according to an embodiment. When the accuracy test for the previous stage is passed, it implies that the training set for the context-matching task has a sufficient number of samples. Hence, the accuracy of the context-matching model may be tested using upcoming new energy systems to evaluate the performance. Accordingly, in an embodiment, additional energy systems 120*n* are used to form the test set for the machine-learning-based context-matching, and the accuracy of the context-matching may be evaluated using this test set. For example, this accuracy test can be, for example, maintaining a classification score higher than a certain threshold for a pre-determined number of consecutive new energy systems 120*n*. The threshold may be chosen, for example, based on the operator's desired performance. In an embodiment, a classification accuracy of higher than 90% may be considered acceptable in a wide range of classification tasks. For example, if the test set contains 10 projects, the context-matching machine learning model may identify which of the machine learning models (610*a*, 610*b*, . . . 610*n*) within the model basis yields the highest prediction accuracy. For the context-matching model to score 90%, the identification should be correct for 9 out of these 10 projects.

Figure 6F:
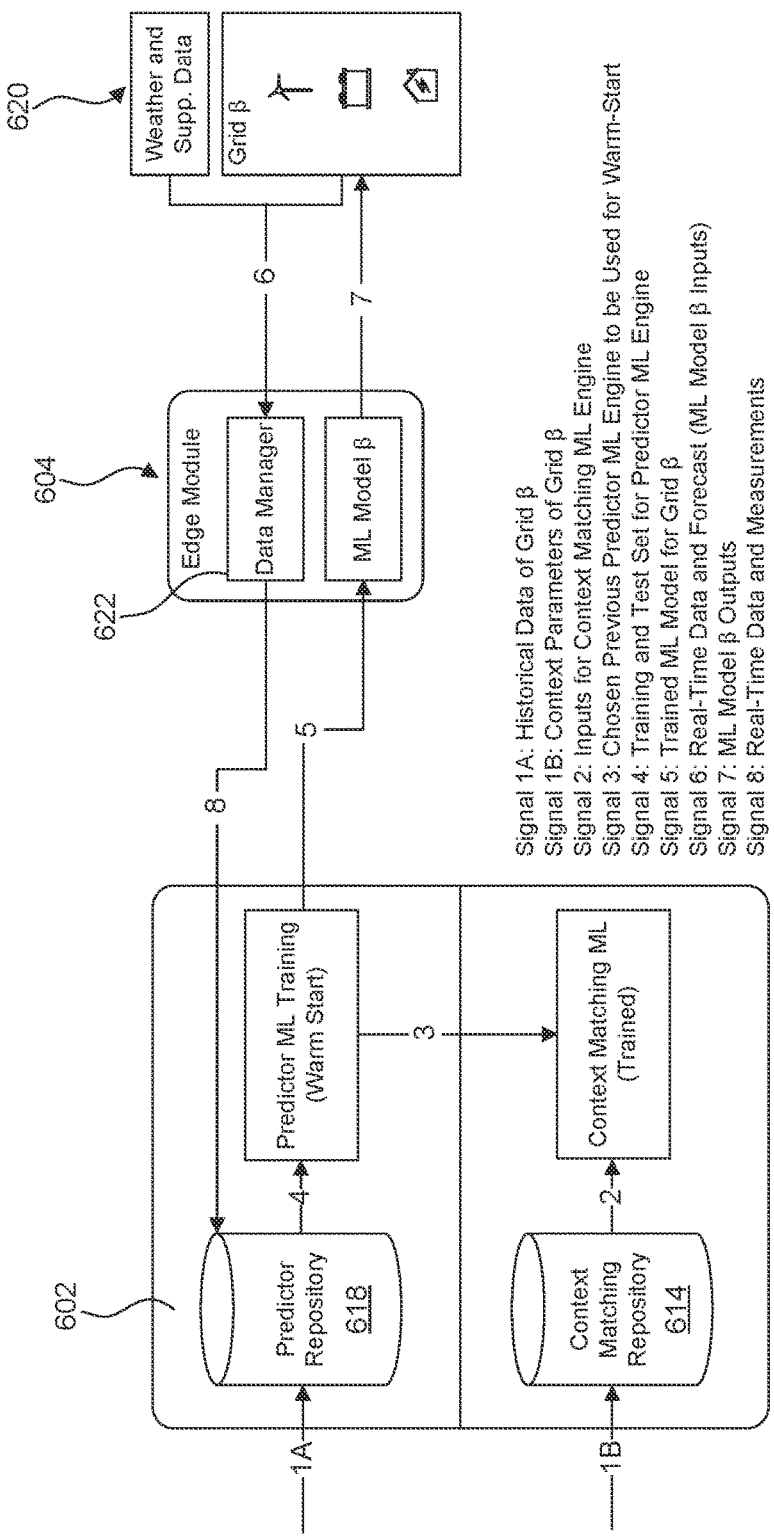

Referring to FIG. 6F, when the context-matching technique passes the accuracy test of the previous phase (described in FIG. 6E), the training phase may be considered complete, and the system 600 may be deployed to perform automatic context-matching for future energy systems. Thus, for the upcoming energy system (3, the context-matching model may first identify a previously trained model for the repository, and then this model may be used to warm-start the predictor training process. This process may be substantially similar to that described with respect to FIGS. 6C-6E.

Figure 7:
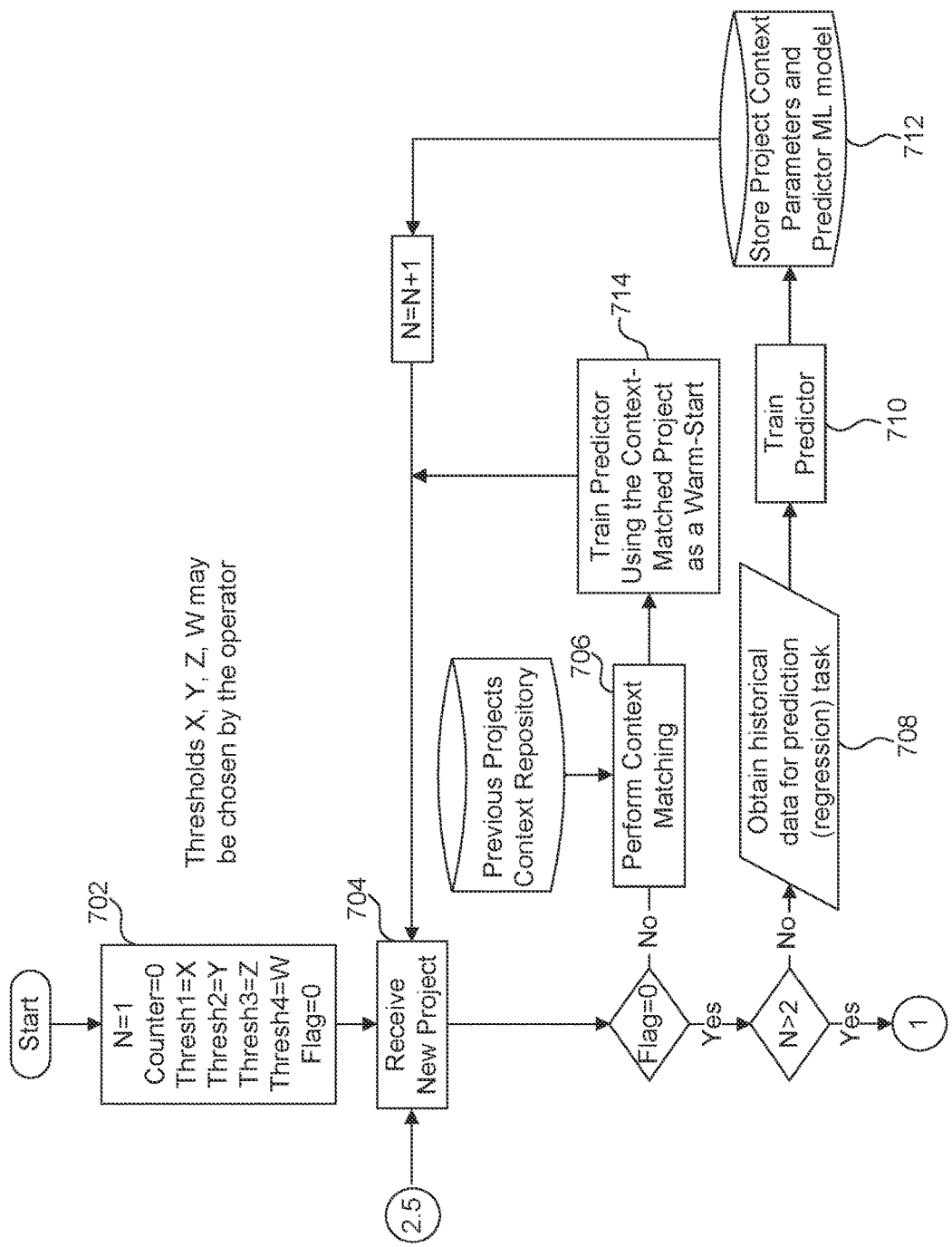
FIG. 7 is an example method 700 for initial training of an energy system, according to some embodiments.

FIG. 7 is an example method 700 for initial training of an energy system, according to some embodiments. Method 700 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

At stage 702, one or more thresholds X, Y, Z, and W, may be determined as described above and a new energy system is prepared for assessment at stage 704. The thresholds may be determined taking into account the parameters of the new energy system. Context matching may be performed at stage 706 using either data received from the energy system at stage 704 or based on the context repository of previous energy systems received, for example, in prior iterations of method 700. In an embodiment, historical data for prediction task may be obtained at stage 708. The historical data may be used to train a predictor at stage 710, which may be integrated into a machine learning model for the new energy system. At stage 712, context parameters and the machine learning model may be stored.

Figure 8:
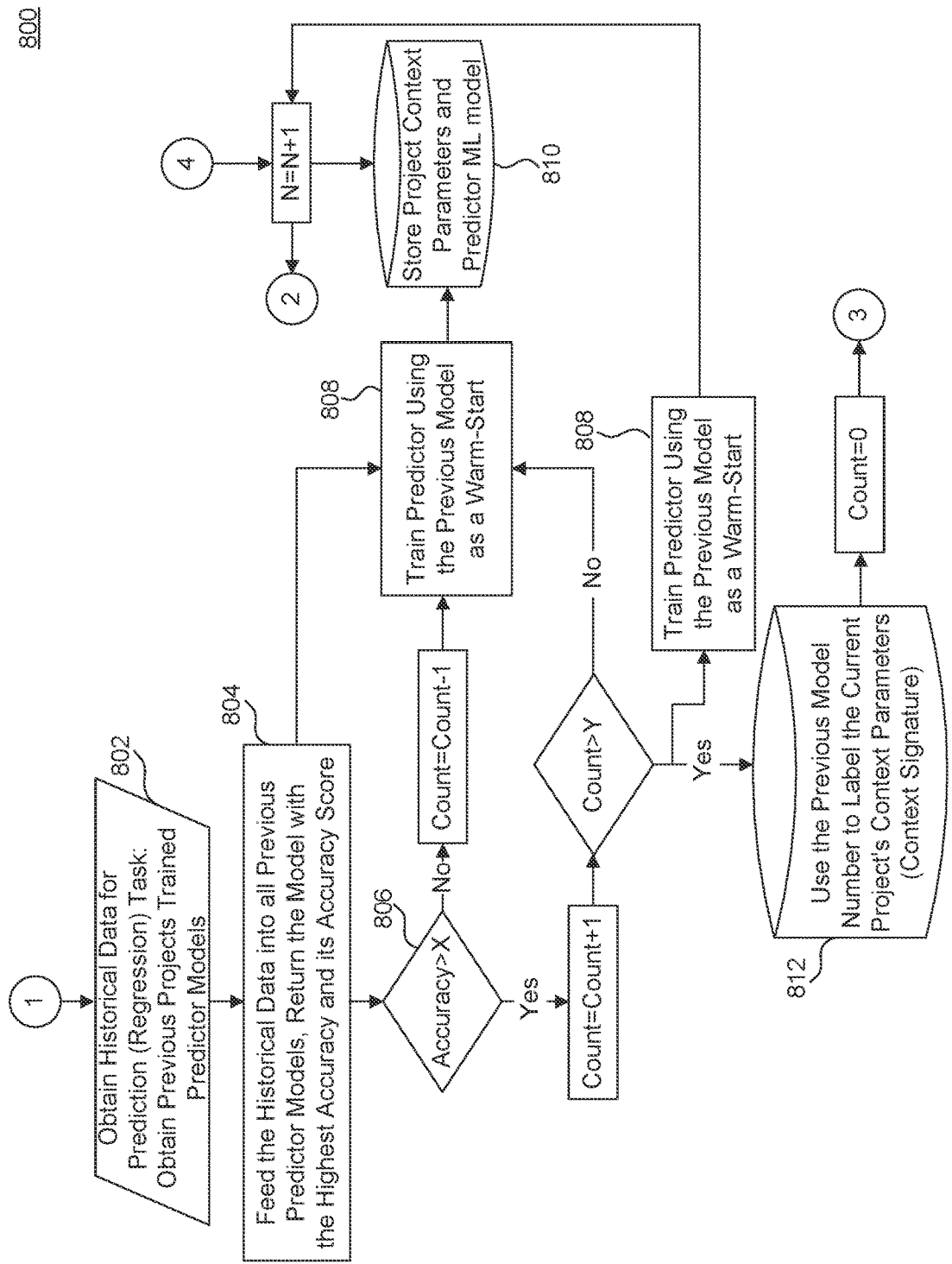
FIG. 8 is another example method 800 for initial training of an energy system, according to some embodiments.

FIG. 8 is another example method 800 for initial training of an energy system, according to some embodiments. Method 800 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

At stage 802, historical data from one or more energy systems, as well as previously trained machine learning models, may be obtained. At stage 804, the data collected at step 802 may then be fed into previous machine learning models and the accuracy may be assessed for each model. At stage 806, the model with the highest accuracy may then be assessed and a determination may be made as to whether the accuracy is above a predetermined threshold. Depending on the results of the accuracy determining step 806, at stage 808, one or more predictors may be trained using the previous model as a warm-start. At stage 810, the context parameters and trained model of the relevant energy system may be stored. At stage 812, in an embodiment, the previous model number may be used to label the context parameters of the current energy systems.

Figure 9:
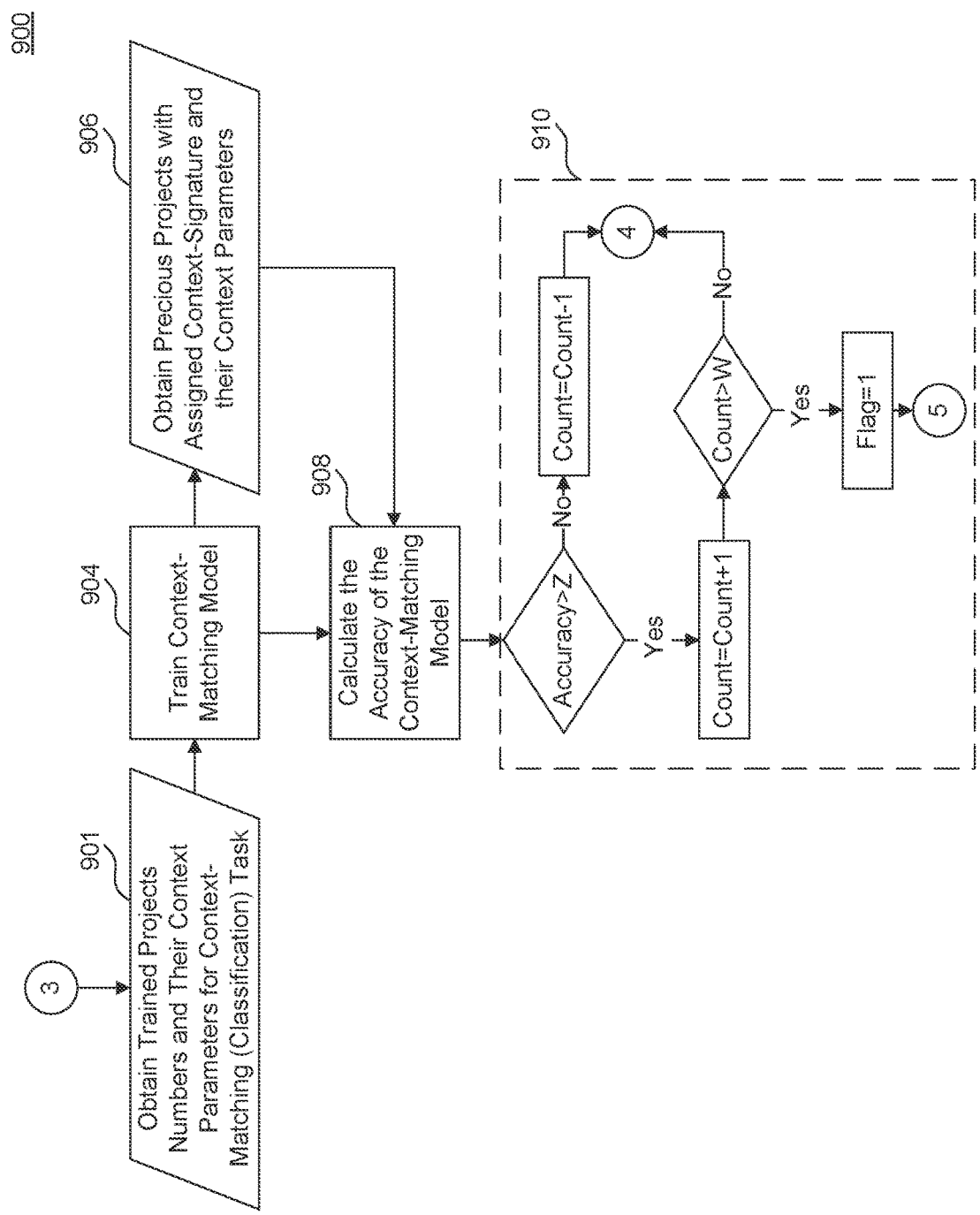
FIG. 9 is an example method 900 for assessing the accuracy of context-matching models, according to some embodiments.

FIG. 9 is an example method 900 for assessing the accuracy of context-matching models (i.e., the classification task, as discussed previously), according to some embodiments. Method 900 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

At stage 902, trained energy systems and their associated context parameters (e.g., the context parameters of energy systems 620a, 620b, and 620c, as discussed with respect to FIGS. 6A-6E) may be obtained. At stage 904, the context-matching model may then be trained, as described with respect to FIGS. 6A-6E. At stage 906, in an embodiment, additional context parameters may be obtained. Then, at stage 908, the accuracy of the trained context-matching model may be calculated. At stage 910, depending on the results of the accuracy calculation in comparison to predefined thresholds (e.g., W and Z), a flag may be set indicating that the accuracy is above the thresholds.

Figure 10:
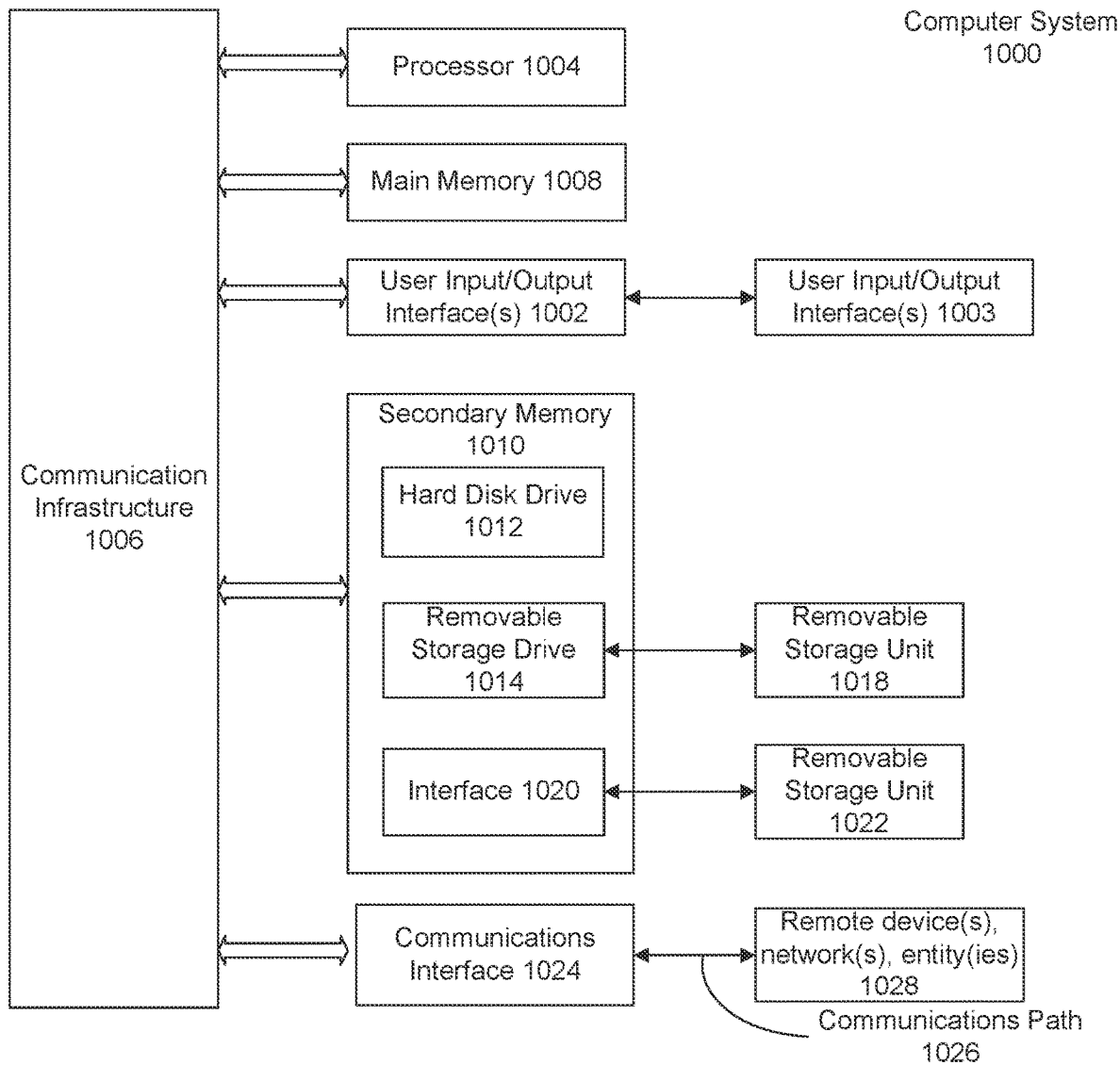
FIG. 10 is an example computer system useful for implementing various embodiments.

Various embodiments can be implemented, for example, using one or more computer systems, such as computer system 1000 shown in FIG. 10. Computer system 1000 can be used, for example, to implement the systems and processes described in FIGS. 1-9. Computer system 1000 can be any computer capable of performing the functions described herein.

Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for deployment of an energy grid subsystem within a renewable energy power grid system, the method comprising:
   receiving, at the renewable energy power grid system, context parameters associated with the energy grid subsystem;
   comparing a context signature of the energy grid subsystem to one or more stored context signatures that are stored in a context container repository, the context signature being assigned based on the context parameters;
   determining whether a match exists based on the comparing;
   based on the match being determined to exist, generating a machine learning model for the energy grid subsystem using an existing machine learning model associated with the matching stored context signature as an initial starting point; and
   causing an operable element in the energy grid subsystem to be controlled based on the generated machine learning model.

2. The method of claim 1, wherein the context parameters include one or more of terrain profiles, longitude, latitude, grid coordinates, contour lines, climate types, seasonal forecasts, wind speed, solar exposure, proximity to water, and average annual temperature.

3. The method of claim 1, further comprising:
   based on determining that a match does not exist, creating a machine learning model based on historical data associated with the energy grid subsystem.

4. The method of claim 1, wherein the context signature represents an environment of the energy grid subsystem.

5. The method of claim 1, wherein the context parameters comprise one or more of load schedules or generator schedules.

6. The method of claim 3, further comprising:
   storing the created machine learning model in the context container repository.

7. The method of claim 1, wherein the comparing comprises:
   generating a similarity metric based on the context signature of the energy grid subsystem and the one or more stored context signatures; and
   comparing the metric to a predefined threshold.

8. The method of claim 1, wherein the machine learning model is used to carry out a task at the energy grid subsystem, the task being at least one of energy generation, energy storage, capacity or load prediction.

9. The method of claim 1, wherein the generating the machine learning model includes using options graph-based learning.

10. The method of claim 1, further comprising:
providing optimization recommendation inputs to the energy grid subsystem.

11. A system for deployment of an energy grid subsystem within a renewable energy power grid system, the system comprising:
a memory; and
one or more processors coupled to the memory, the one or more processors configured to:
receive, at the renewable energy power grid system, context parameters associated with the energy grid subsystem;
compare a context signature of the energy grid subsystem to one or more stored context signatures that are stored in a context container repository, the context signature being assigned based on the context parameters;
determine whether a match exists based on the comparing;
based on the match being determined to exist, generate a machine learning model for the energy grid subsystem using an existing machine learning model associated with the matching stored context signature as an initial starting point; and
cause an operable element in the energy grid subsystem to be controlled based on the generated machine learning model.

12. The system of claim 11, wherein the context parameters include one or more of terrain profiles, longitude, latitude, grid coordinates, contour lines, climate types, seasonal forecasts, wind speed, solar exposure, proximity to water, and average annual temperature.

13. The system of claim 11, wherein the one or more processors are further configured to:
based on determining that a match does not exist, create a machine learning model based on historical data associated with the energy grid subsystem.

14. The system of claim 11, wherein the context signature represents an environment of the energy grid subsystem.

15. The system of claim 11, wherein the context parameters comprise one or more of load schedules or generator schedules.

16. The system of claim 13, wherein the one or more processors are further configured to:
store the created machine learning model in the context container repository.

17. The system of claim 11, wherein the one or more processors are further configured to compare the context signature of the energy grid subsystem to the one or more stored context signatures that are stored in the context container repository by:
generating a similarity metric based on the context signature of the energy grid subsystem and the one or more stored context signatures; and
comparing the metric to a predefined threshold.

18. The system of claim 11, wherein the machine learning model is used to carry out a task at the energy grid subsystem, the task being at least one of energy generation, energy storage, capacity or load prediction.

19. The system of claim 11, wherein the one or more processors are further configured to generate the machine learning model by using options graph-based learning.

20. The system of claim 11, wherein the one or more processors are further configured to:
provide optimization recommendation inputs to the energy grid subsystem.

* * * * *